(12) United States Patent
Lee (10) Patent No.: US 9,630,668 B1
(45) Date of Patent: Apr. 25, 2017

(54) SECURING DEVICE FOR SECURING SEAT TO SEAT POST

(71) Applicant: Chien Hao Lee, Taichung (TW)

(72) Inventor: Chien Hao Lee, Taichung (TW)

( * ) Notice: Subject to any disclaimer, the term of this patent is extended or adjusted under 35 U.S.C. 154(b) by 0 days.

(21) Appl. No.: 14/979,734

(22) Filed: Dec. 28, 2015

(51) Int. Cl.
*B62J 1/04* (2006.01)

(52) U.S. Cl.
CPC ........................ *B62J 1/04* (2013.01)

(58) Field of Classification Search
CPC .......................................................... B62J 1/04
USPC ............................ 297/195.1, 215.14, 215.15
See application file for complete search history.

(56) References Cited

U.S. PATENT DOCUMENTS

| | | | | |
|---|---|---|---|---|
| 5,466,042 A * | 11/1995 | Herman | ................... | B62J 1/08 297/195.1 |
| 5,988,741 A * | 11/1999 | Voss | ........................ | B62J 1/08 297/215.14 |
| 7,562,932 B2 * | 7/2009 | Chiang | ...................... | B62J 1/08 297/215.14 |
| 7,997,645 B2 * | 8/2011 | Tseng | ......................... | B62J 1/08 297/215.14 |
| 2016/0185408 A1 * | 6/2016 | Henderson | ................. | B62J 1/08 297/215.15 |

\* cited by examiner

*Primary Examiner* — Anthony D Barfield
(74) *Attorney, Agent, or Firm* — Rosenberg, Klein & Lee (57) ABSTRACT

A securing device for bicycle seat includes a seat post with two receiving faces defined in the top thereof, and an installation hole is defined radially in the seat post. A clamp unit includes a top clamp and a bottom clamp so as to clamp the rails of the seat. The bottom clamp has an engaging face which is engaged with the receiving faces of the seat post. An insertion member has its top end inserted in the installation hole and has positioning end at the lower end thereof, the positioning end contacts against the outside of the seat post. A securing member extends through the insertion member and the bottom clamp and is threadedly connected to the top clamp so as to secure the seat to the seat post.

8 Claims, 11 Drawing Sheets

SECURING DEVICE FOR SECURING SEAT TO SEAT POST

BACKGROUND OF THE INVENTION

1. Fields of the Invention

The present invention relates to a securing device, and more particularly, to a bicycle seat securing device for securely connecting a seat to a seat post.

2. Descriptions of Related Art

The conventional bicycle seat is connected to the top of the seat post which is inserted into the seat tube of the bicycle frame. A clamp unit is used to clamp the rails on the underside of the seat to the seat post. The clamp unit allows the user to adjust the inclination and position of the sat relative to the seat post according to different users and road conditions.

The conventional clamp unit is secured either along an upright direction or a transverse direction relative to the seat post.

A conventional clamp unit secured along an upright direction known to applicant comprises a seat post with a support portion on the top of the seat post. A clamp unit has a top clamp and a bottom clamp, wherein an anti-slip member is located between the clamp unit and the support portion of the seat post to let the support portion contacts at least one portion of the bottom clamp by the anti-slip member.

The support portion is a curved portion and has a hole. The top clamp has a threaded hole and the bottom clamp has a slot. The anti-slip member has a through hole. The rails of the seat are clamped between the top and bottom clamps. A bolt extends through an aperture of the seat post, the through hole of the anti-slip member and the slot of the bottom clamp, and is threadedly connected to the threaded hole of the top clamp.

The conventional clamp unit secured along the transverse direction known to applicant comprises a base part at the top of the seat post and the base part has a transverse hole. Two cone-shaped connection members respectively protrude from two ends of the transverse hole. Each of the cone-shaped connection members has a saddle member which has a saddle arm extending therefrom. Each saddle member has a side cover and a clamp arm so as to clamp the rail between the clamp arm and the saddle arm. A locking member extends through the side coves, the saddle members and the transverse hole of the base part so that the side covers and the saddle members securely clamp the top of the seat post.

Either of the two conventional clamp unit of the seat post has to drill a hole through the baes part on the top end of the seat post so that the bolt extends through the hole to secure the clamp members between which the rails are clamped. The support portion/base part has a certain weight which cannot meet the requirement of light weight, and the formation of the support portion/base part and the hole through the support portion/base part may increase the manufacturing cost.

The present invention intends to provide a bicycle seat securing device for securely connecting a seat to a seat post, and the securing device eliminates the shortcomings mentioned above.

SUMMARY OF THE INVENTION

The present invention relates to a securing device for bicycle seat, and comprises a seat post having two curved receiving faces defined in the top thereof and the two receiving faces are located symmetrically relative to the axis of the seat post. An inclined installation hole is defined radially through the wall of the seat post. A clamp unit has a top clamp and a bottom clamp, wherein each of the top and bottom clamps is a curved plate and has a first/second hole defined centrally therethrough. A tubular space is formed between the top and bottom clamps. The top clamp has two first notches defined in each of two sides thereof, and the bottom clamp has two second notches defined in each of two sides thereof. The bottom clamp has an engaging face defined in the underside thereof. The top clamp is connected to the bottom clamp to align the first notches and the second notches so as to receive two rails of a seat. The top and bottom clamps are connected to the top of the seat post. The engaging face of the bottom clamp is engaged with the two receiving faces of the seat post.

An insertion member has a tube which has a lateral hole defined through the wall thereof. A positioning end is formed on the lower end of the tube and extends at an angle relative to the axis of the tube. A flange extends from the periphery of the positioning end. The tube is inserted into the insertion hole of the seat post and the flange contacts against outside of the tube. A securing member has a head and a threaded portion on two ends thereof. The threaded portion extends through the lateral hole, a top hole defined in the top end of the tube and the second hole of the bottom clamp, and is threadedly connected to the top clamp.

The clamp unit is directly connected to the top of the seat post, and the securing member extends through the insertion member and is connected to the top and bottom clamps to secure the seat to the seat post. There will be no support portion or base part on the seat post to effectively reduce the weight. The structure is simple and has lower manufacturing cost.

The present invention reduces ⅕ of the weight of the conventional clamp device. The parts of the present invention are easily manufactured and the assembly is simple.

The bottom clamp is securely engaged with the receiving faces by engaging the second teeth with the first teeth. The top clamp has a locking member received therein to be securely connected with the securing member to firmly press the top clamp to the bottom clamp, and to firmly press the bottom clamp to the seat post.

The shape of the bottom clamp and the receiving faces of the seat post can be protrusion-recess cooperation so that the user can adjust the seat in a step-less way.

The seat post can be made by carbon-fiber and is cooperated with the reinforcement member which reinforces the structural strength of the connection between the seat post and the clamp unit.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
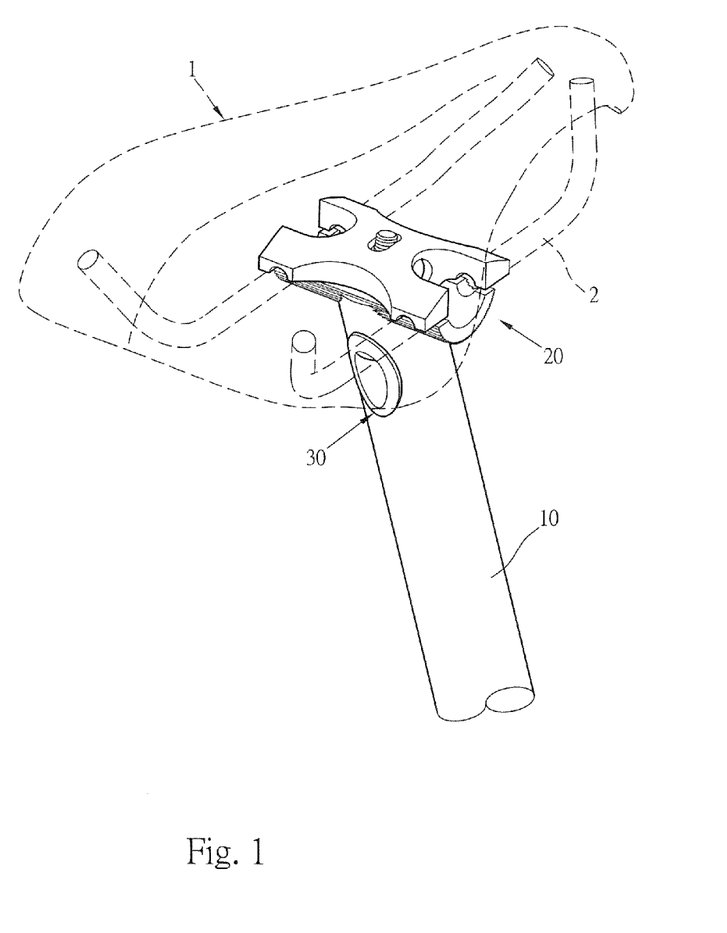
FIG. 1 is a perspective view to show the securing device of the present invention.
Figure 2:
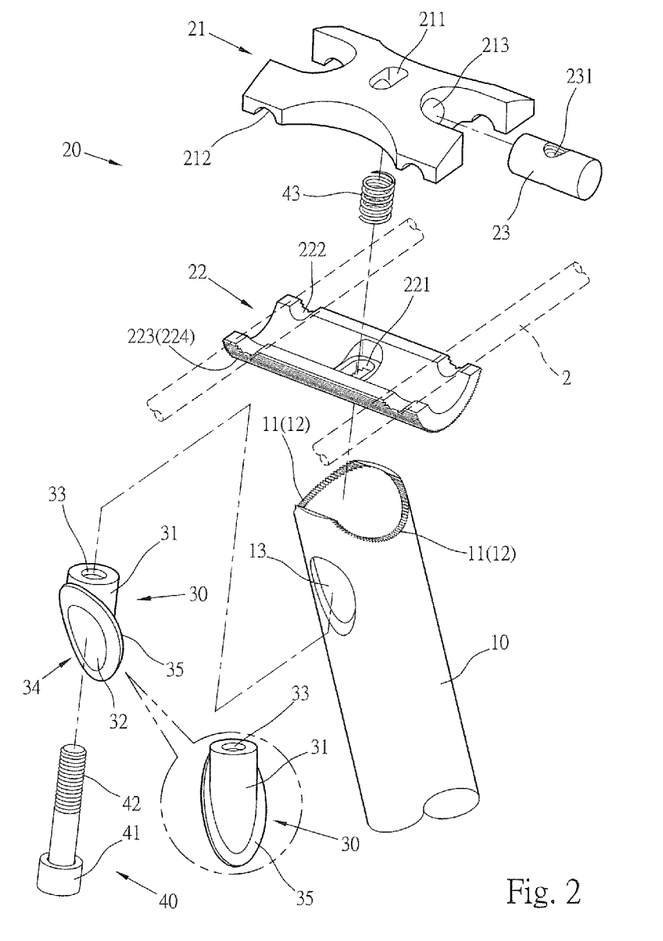
FIG. 2 is an exploded view of the securing device of the present invention.
Figure 3:
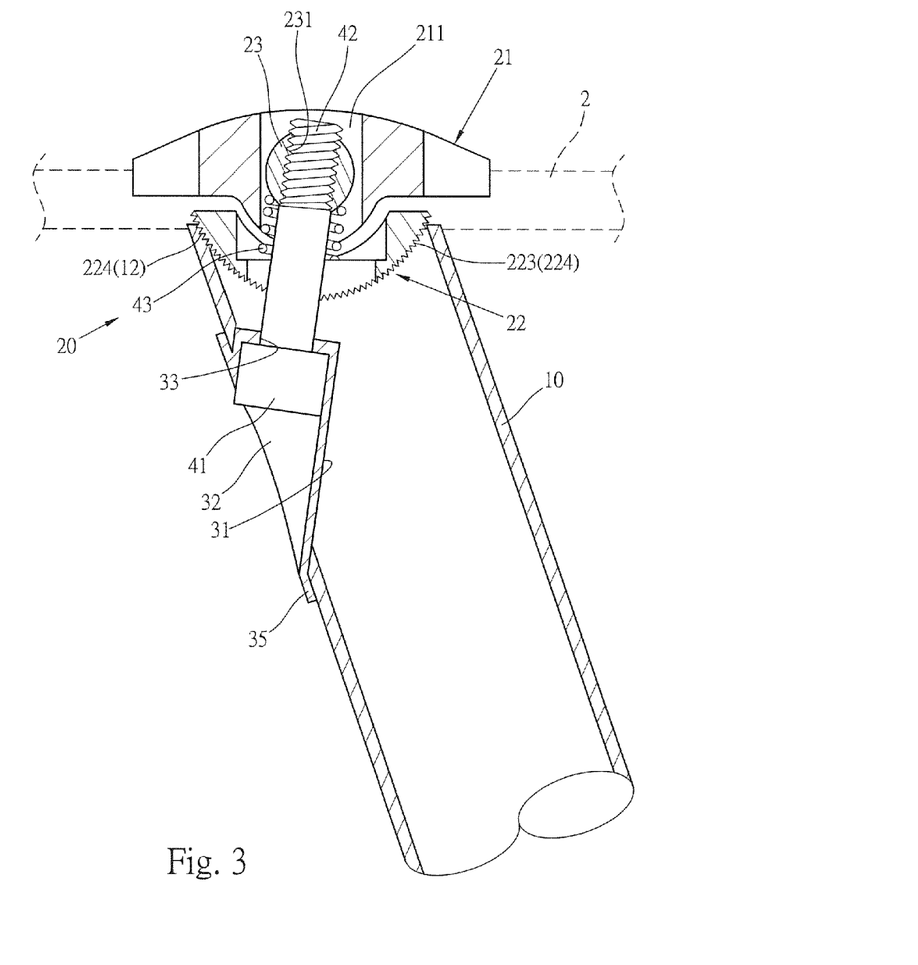
FIG. 3 is a cross sectional view of the securing device of the present invention.

Referring to FIGS. 1 to 3, the securing device of the present invention comprises a seat post 10, a clamp unit 2, an insertion member 30 and a securing member 40.

The seat post 10 has two curved receiving faces 11 defined in the top thereof and the two receiving faces 11 are located symmetrically relative to the axis of the seat post 10. The top of the seat post 10 is an open top and the two receiving faces 11 are defined in the top end of the open top of the seat post 10. Each of the receiving faces 11 has first teeth 12 defined therein. An inclined installation hole 13 is defined radially through the wall of the seat post 10. The periphery of the installation hole 13 extends an angle relative to the axis of the seat post 10. The installation hole 13 is located at a distance from and between the two receiving face 11.

The clamp unit 20 has a top clamp 21 and a bottom clamp 22. Each of the top and bottom clamps 21, 22 is a curved plate and has a first/second hole 211/221 defined centrally therethrough. A tubular space is formed between the top and bottom clamps 21, 22. The top clamp 21 has two first notches 212 defined in each of two sides thereof, and the bottom clamp 22 having two second notches 222 defined in each of two sides thereof. The top clamp 21 has an elongate first hole 211 defined centrally therethrough. The top clamp 21 further has a passage 213 defined transversely therethrough, and a cylindrical locking member 23 is inserted into the passage 213. The locking member 23 has a threaded hole 231 defined radially therethrough. The bottom clamp 22 has an elongate second hole 221 defined centrally therethrough. The bottom clamp 22 has an engaging face 223 defined in the underside thereof. The engaging face 223 of the bottom clamp 22 has second teeth 224 defined therein. The top clamp 21 is connected to the bottom clamp 22 to align the first notches 212 and the second notches 222 so as to receive two rails 2 of a seat 1 therethrough. The top and bottom clamps 21, 22 are connected to the top of the seat post 10, and the engaging face 223 of the bottom clamp 22 is engaged with the two receiving faces 11 of the seat post 10 by engaging the second teeth 224 with the first teeth 12.

The insertion member 30 has a tube 31 which has a lateral hole 32 defined through the wall thereof. A top hole 33 is defined in the top end of the tube 31, and a positioning end 34 is formed on the lower end of the tube 31 and extends at an angle relative to the axis of the tube 31. A flange 35 extends from the periphery of the positioning end 34. The tube 31 is inserted into the insertion hole 13 of the seat post 10 and the flange 35 contacts against outside of the tube 31. Therefore, the insertion member 30 is inclined in the seat post 10.

The securing member 40 has a head 41 and a threaded portion 42 on two ends thereof. The diameter of the top hole 33 of the tube 31 is smaller than that of the lateral hole 32, and the diameter of the head 41 of the securing member 40 is greater than the outer diameter of the threaded portion 42. The threaded portion 42 extending through the lateral hole 32, the top hole 33 of the tube 31 and the second hole 221 of the bottom clamp 22 and a spring 43, and is threadedly connected to the threaded hole 231 of the locking member 23 in the top clamp 21. The head 41 is restricted in the lateral hole 32 as shown in FIG. 3. The securing member 40 pulls the top clamp 21 to press onto the bottom clamp 22 such that the bottom clamp 22 is securely connected to the top of the seat post 10.

Figure 4:
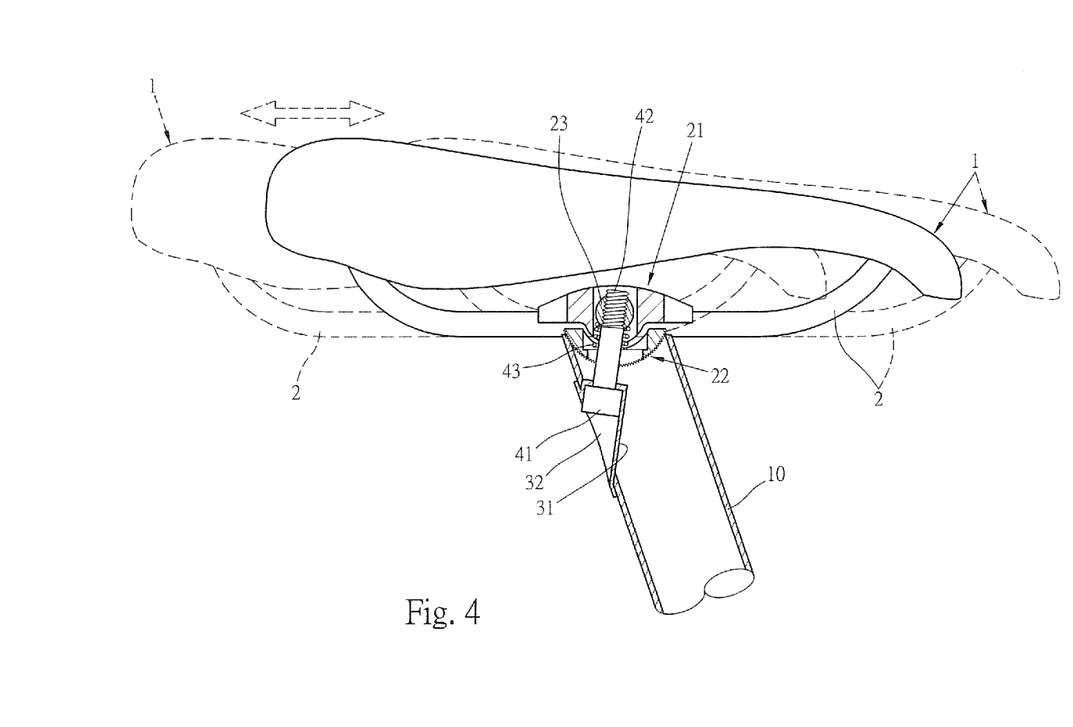
FIG. 4 is a side cross sectional view to show the back and forth adjustment of the seat.
Figure 5:
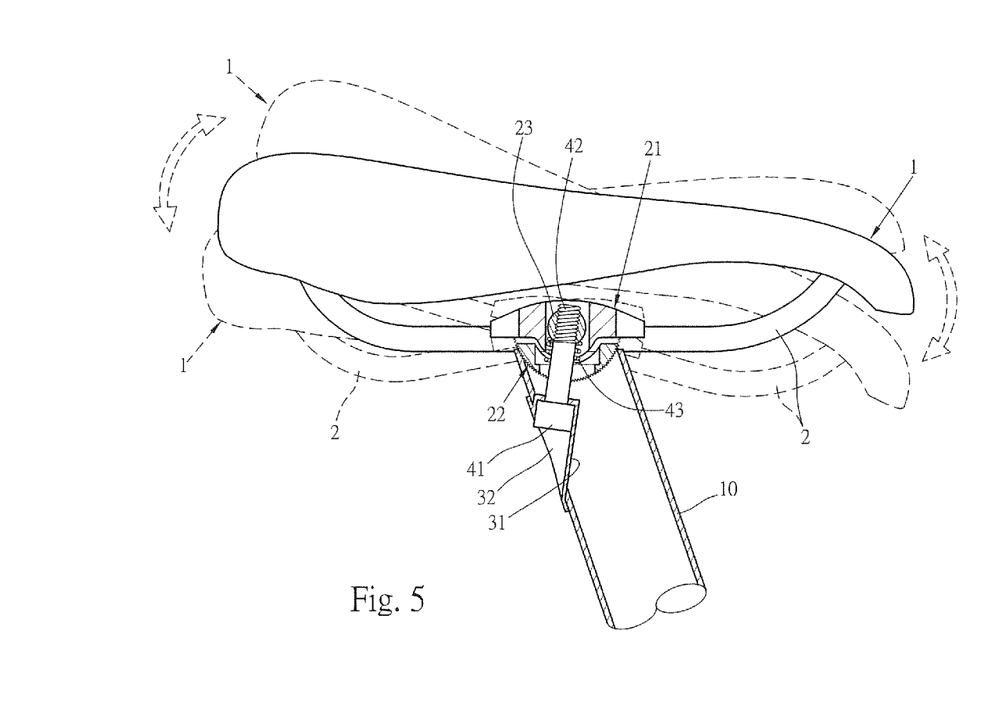
FIG. 5 is a side cross sectional view to show the pivotal adjustment of the seat.

When in use, when the securing member 40 is tightened, the securing member 40 pulls the top clamp 21 to press onto the bottom clamp 22 such that the bottom clamp 22 is securely connected to the top of the seat post 10. Therefore, the rails 2 of the seat 1 is firmly clamped between the top and bottom clamps 21, 22. The engagement between the first and second teeth 12, 224 of the receiving faces 11 and the bottom clamp 22 further secure the position of the clamp unit 20 and the seat 1. As shown in FIG. 4, when adjusting the seat 1, the securing member 40 is slightly unscrewed, the spring 43 quickly slightly pushes the top and bottom clamps 21, 22 apart from each other, the seat 1 can then be adjusted back and forth. As shown in FIG. 5, by the elongate first and second holes 211, 221 of the top and bottom clamps 21, 22, the top and bottom clamps 21, 22 can be pivoted relative to the receiving faces 11 of the seat post 10, such that the seat 1 can be pivoted relative to the seat post 10. After the desired adjustment is completed, the securing member 40 is tightened again to set the position of the seat 1.

Figure 6:
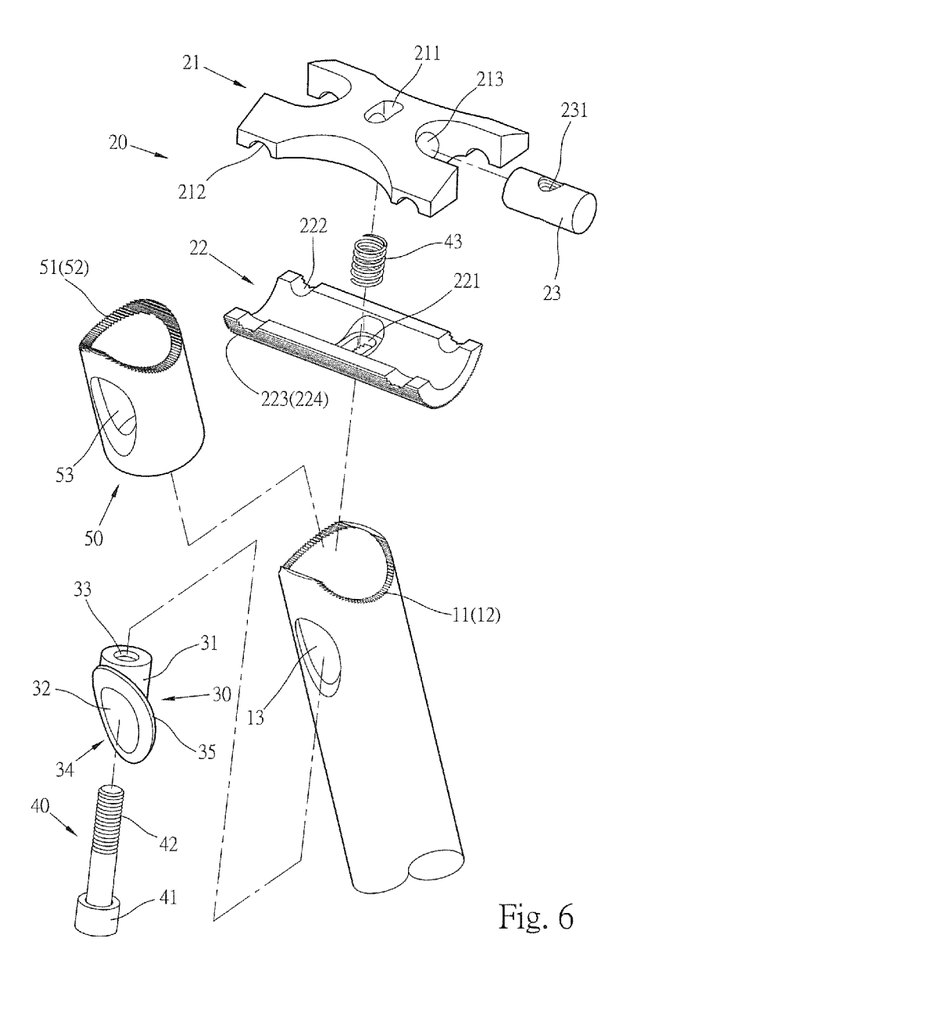
FIG. 6 is an exploded view of the second embodiment of the securing device of the present invention.
Figure 7:
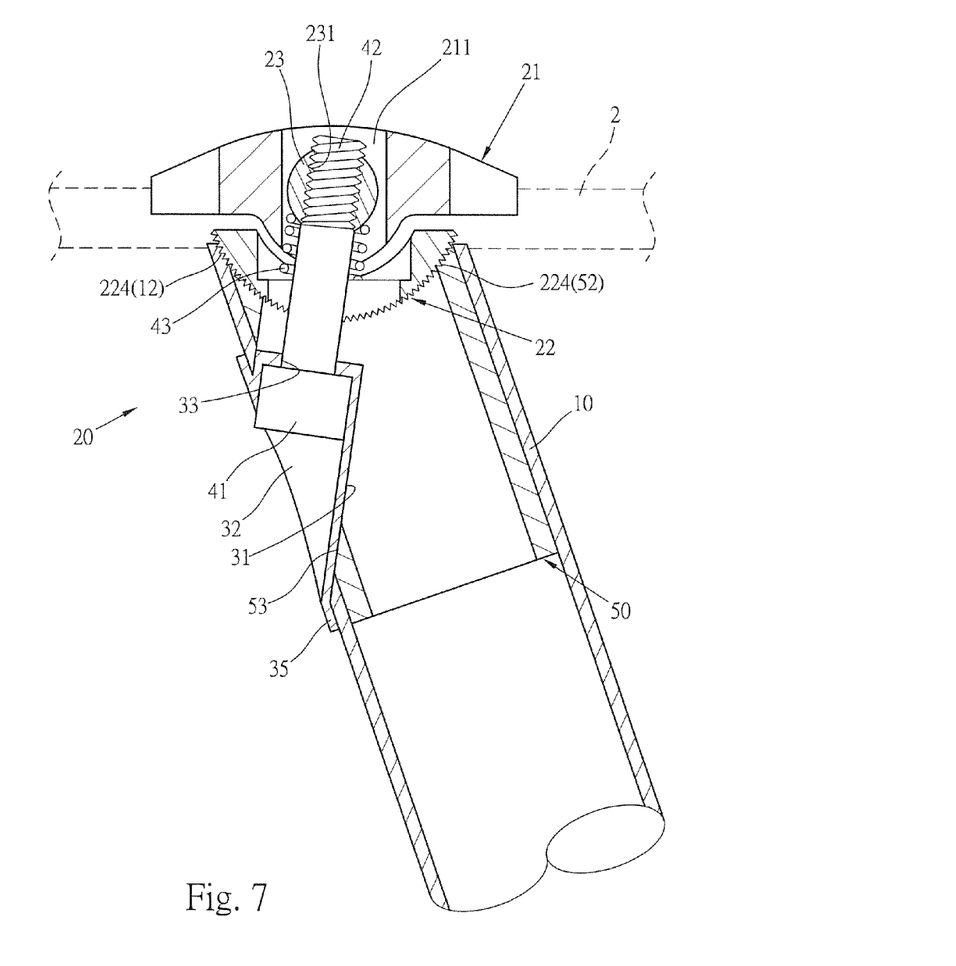
FIG. 7 is a cross sectional view of the securing device of the present invention in FIG. 6.
Figure 8:
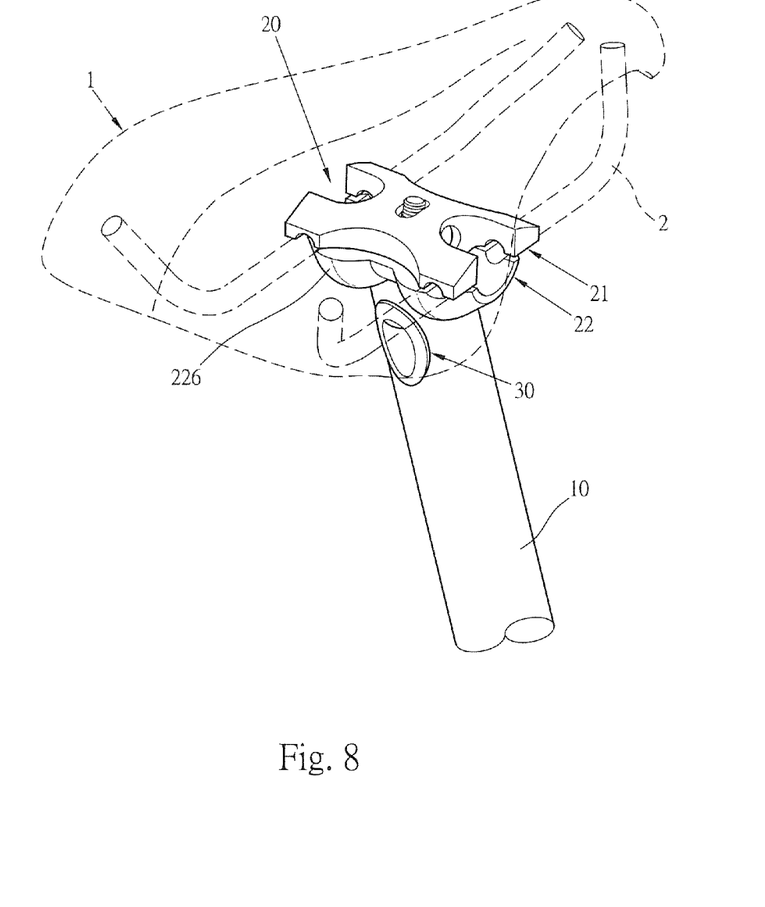
FIG. 8 is an exploded view of the third embodiment of the securing device of the present invention.
Figure 9:
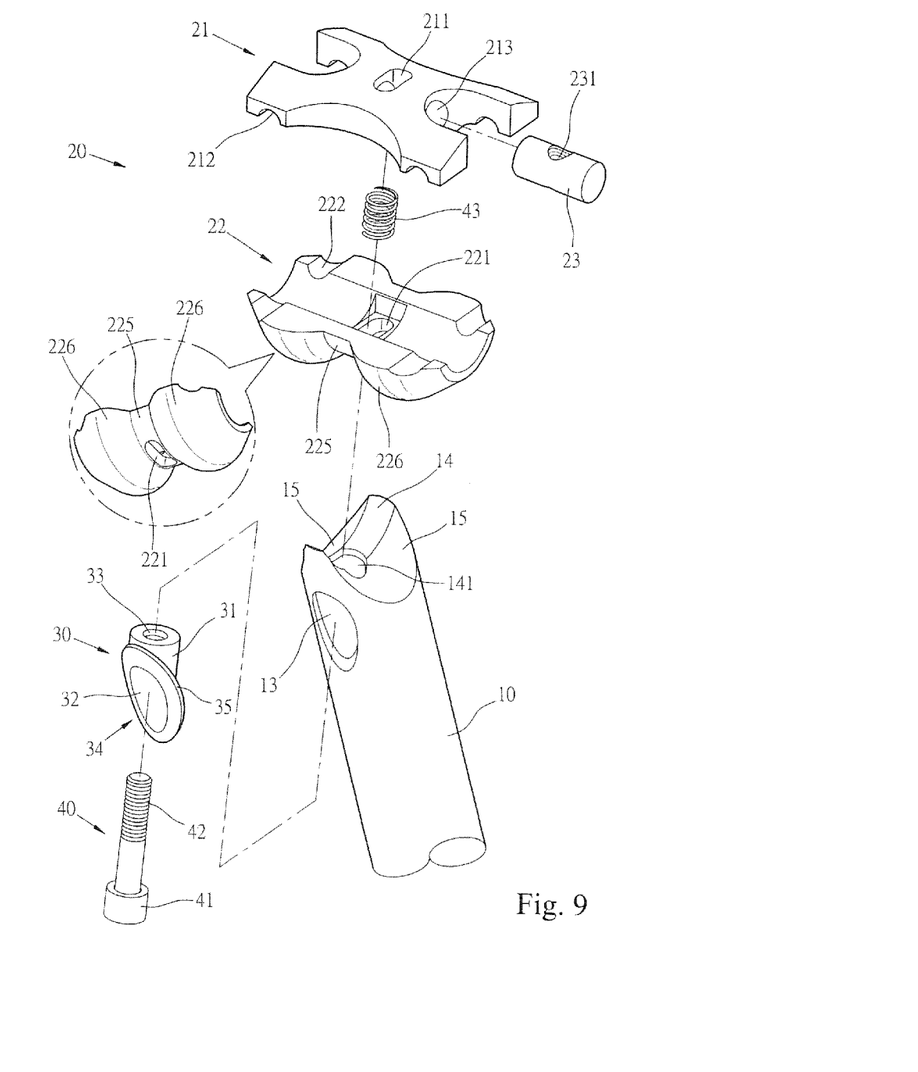
FIG. 9 is an exploded view of the second embodiment of the securing device of the present invention in FIG. 8.
Figure 10:
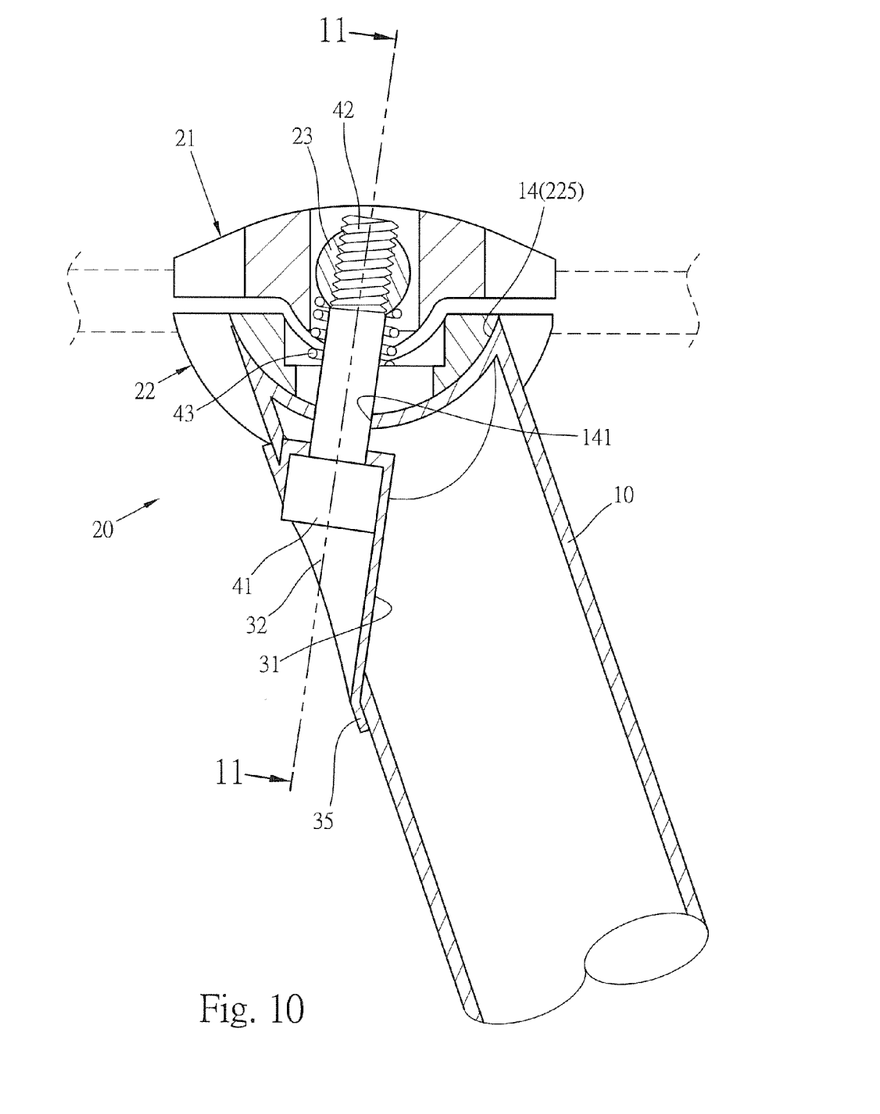
FIG. 10 is a cross sectional view of the securing device of the present invention in FIG. 8.
Figure 11:
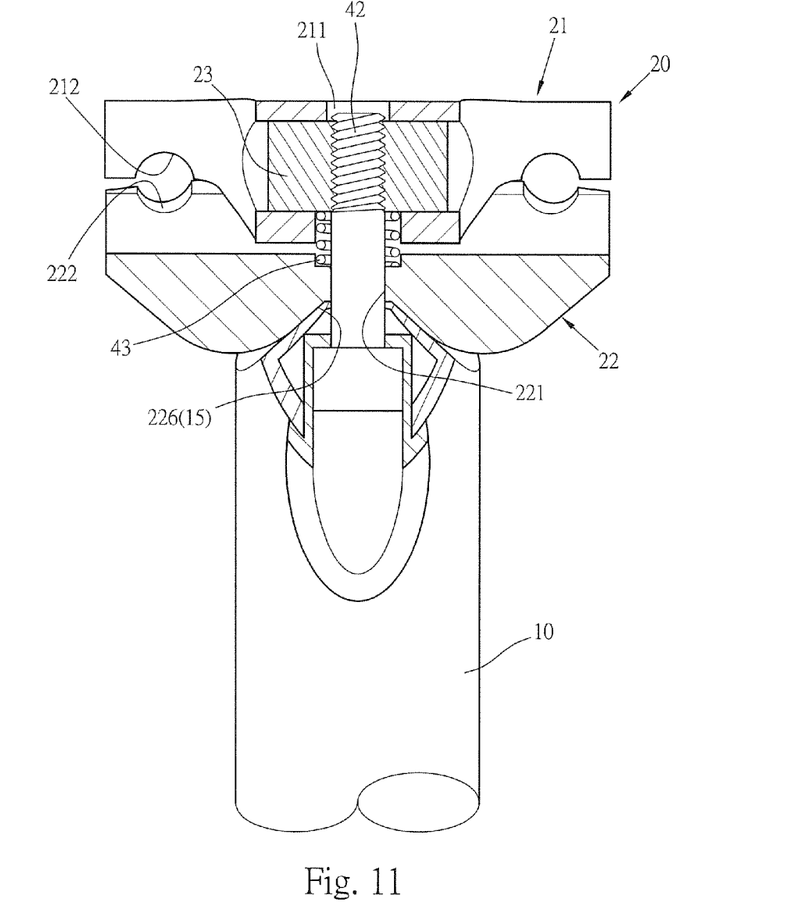
FIG. 11 is another cross sectional view of the securing device of the present invention in FIG. 8.

As shown in FIGS. 6 and 7, the second embodiment shows that the seat post 10 is made by carbon-fiber, and a reinforcement member 50 is inserted into the top of the seat post 10. The reinforcement member 50 is a tubular member with two open ends, two reinforcement receiving faces 51 are defined in the top of the reinforcement member 50. Each of the reinforcement receiving faces 51 has third teeth 52. The reinforcement receiving faces 51 have the same curvature as the receiving faces 11 and are aligned with the receiving faces 11. The reinforcement member 50 has a through hole 53 defined laterally through the wall thereof, the through hole 53 communicates with the installation hole 13. The periphery of the through hole 53 has the same inclination as that of the installation hole 13. The through hole 53 is located at a distance from and between the two reinforcement receiving faces 51. The securing member 40 extends through the through hole 53 and is connected to the threaded hole 231 in the locking member 23. The reinforcement member 50 reinforces the strength of the connection between the carbon-fiber seat post 10 and the clamp unit 20.

As shown in FIGS. 8 to 11, the third embodiment of the present invention is disclosed, wherein the seat post 10 has a closed top end which has a first receiving face 14 defined in the central portion thereof. A hole 141 is defined through centrally through the first receiving face 14. The threaded portion 42 of the securing member 40 extends through the hole 141 of the first receiving face 14 to be connected to the threaded hole 231 in the locking member 23. Two second receiving faces 15 are respectively defined in two sides of the first receiving face 14, the two second receiving faces 15 extend downward from two sides of the first receiving face 14. Each of the first receiving face 14 and the two second receiving faces 15 has a recessed curvature. The bottom clamp 22 has a first match face 225 formed in the underside thereof, and two second match faces 226 respectively protrude from the underside of the bottom clamp 22 and are located on two sides of the first match face 225. The first match face 225 is engaged with the first receiving face 14, and the two second match faces 226 are two semi-spherical protrusions and respectively engaged with the two second receiving faces 15. Therefore, bottom clamp 22 can be pivoted along the two second match faces 226 and the two second receiving faces 15. The two second match faces 226 and the two second receiving faces 15 are smooth so that the adjustment can be made in a step-less way.

The advantages of the present invention are that the clamp unit 20 is directly connected to the top of the seat post 10, and the securing member 40 extends through the insertion member 30 and is connected to the top and bottom clamps 21, 22 to secure the seat 1 to the seat post 10. No support portion or base part on the seat post is needed so as to effectively reduce the weight. The structure is simple and has lower manufacturing cost.

The present invention reduces 1/5 of the weight of the conventional clamp device. The parts of the present invention are easily manufactured and the assembly is simple.

The bottom clamp 22 is securely engaged with the receiving faces 11 by engaging the second teeth 224 with the first teeth 12. The top clamp 21 has a locking member 23 received therein to be securely connected with the securing member 40 to firmly press the top clamp 21 to the bottom clamp 22, and to firmly press the bottom clamp 22 to the seat post 10.

The shape of the bottom clamp 22 and the receiving faces 11 of the seat post 10 can be protrusion-recess cooperation so that the user can adjust the seat in a step-less way.

The seat post 10 can be made by carbon-fiber and is cooperated with the reinforcement member 50 which reinforces the structural strength of the connection between the seat post 10 and the clamp unit 20.

While we have shown and described the embodiment in accordance with the present invention, it should be clear to those skilled in the art that further embodiments may be made without departing from the scope of the present invention.

What is claimed is:

1. A securing device for bicycle seat, comprising:
    a seat post having two curved receiving faces defined in a top thereof and the two receiving faces located symmetrically relative to an axis of the seat post, an inclined installation hole defined radially through a wall of the seat post;
    a clamp unit having a top clamp and a bottom clamp, each of the top and bottom clamps being a curved plate and having a first/second hole defined centrally therethrough, a tubular space formed between the top and bottom clamps, the top clamp having two first notches defined in each of two sides thereof, the bottom clamp having two second notches defined in each of two sides thereof, the bottom clamp having an engaging face defined in an underside thereof, the top clamp connected to the bottom clamp to align the first notches and the second notches so as to receive two rails of a seat therethrough, the top and bottom clamps connected to the top of the seat post, the engaging face of the bottom clamp engaged with the two receiving faces of the seat post;
    an insertion member having a tube which has a lateral hole defined through a wall thereof, a positioning end formed on a lower end of the tube and extending at an angle relative to an axis of the tube, a flange extending from an periphery of the positioning end, the tube inserted into the installation hole of the seat post and the flange contacting against outside of the tube, and
    a securing member having a head and a threaded portion on two ends thereof, the threaded portion extending through the lateral hole, a top hole defined in a top end of the tube and the second hole of the bottom clamp, and being threadedly connected to the top clamp.

2. The securing device as claimed in claim 1, wherein the top of the seat post is an open top and the two receiving faces are defined in a top end of the open top of the seat post, each of the receiving faces has first teeth defined therein, the engaging face of the bottom clamp has second teeth defined therein, the first teeth of the two receiving faces are engaged with the second teeth of the bottom clamp.

3. The securing device as claimed in claim 1, wherein the installation hole has a periphery which extends an angle relative to the axis of the seat post, the installation hole is located at a distance from and between the two receiving face.

4. The securing device as claimed in claim 1, wherein the top clamp has an elongate first hole defined centrally therethrough, the bottom clamp has an elongate second hole defined centrally therethrough.

5. The securing device as claimed in claim 1, wherein the top clamp has a passage defined transversely therethrough, a cylindrical locking member is inserted into the passage and has a threaded hole defined radially therethrough, the threaded portion of the securing member is threadedly connected to the threaded hole.

6. The securing device as claimed in claim 1, wherein a diameter of the top hole of the tube is smaller than that of the lateral hole, a diameter of the head of the securing member is greater than an outer diameter of the threaded portion, the head is restricted in the lateral hole.

7. The securing device as claimed in claim 1, wherein the top of the seat post is an open top and the two receiving faces are defined in a top end of the open top of the seat post, each of the receiving faces has first teeth defined therein, the engaging face of the bottom clamp has second teeth defined therein, the first teeth of the two receiving faces are engaged with the second teeth of the bottom clamp, a reinforcement member is inserted into the top of the seat post, the reinforcement member is a tubular member with two open ends, two reinforcement receiving faces are defined in a top of the reinforcement member, each of the reinforcement receiving faces has third teeth, the reinforcement member has a through hole defined laterally through a wall thereof, the through hole communicates with the installation hole.

8. The securing device as claimed in claim 1, wherein the seat post has a closed top end which has a first receiving face defined in a central portion thereof, a hole is defined through centrally through the first receiving face, the threaded portion of the securing member extends through the hole of the first receiving face, two second receiving faces are respectively formed in two sides of the first receiving face, the bottom clamp has a first match face formed in the underside thereof, two second match faces respectively protrude from the underside of the bottom clamp and are located on two sides of the first match face, the first match face is engaged with the first receiving face, the two second match faces are respectively and pivotably engaged with the two second receiving faces.

* * * * *